UNITED STATES PATENT OFFICE.

JULIUS ELSNER, OF BERLIN-FRIEDENAU, GERMANY.

METHOD FOR THE PRODUCTION OF HYDRAULIC LIME AND CEMENT FROM COMBUSTION RESIDUES OF SEWAGE, CANAL-SLUDGE, OR THE LIKE.

1,220,735.

Specification of Letters Patent.

Patented Mar. 27, 1917.

No Drawing. Application filed December 26, 1913, Serial No. 808,920. Renewed January 29, 1917. Serial No. 145,280½.

*To all whom it may concern:*

Be it known that I, JULIUS ELSNER, engineer, subject of the German Emperor, residing at Kaiser Allee 74, Berlin-Friedenau, Germany, have invented a certain new and useful Improved Method for the Production of Hydraulic Lime and Cement from Combustion Residues of Sewage, Canal-Sludge, or the like; and I hereby declare the following to be a full, clear, and exact description of the invention, such as will enable others skilled in the art to which it appertains to make and use the same.

In the combustion and the removal of gases from wastes such as sewage, canal sludge and the like the residues amount to about one half of the total of the treated material so that the economical qualities of combustion apparatus of this kind are essentially submitted to the utilization of the said residues.

According to this invention these residues are treated to give hydraulic lime, ordinary cement or Portland cement in a more simple manner than hitherto, that is without making use of more expensive processes, the above products being obtained according to the nature of the residues and the quantity and kind of the additional substances.

In carrying out this invention the residues, according to their composition, are treated with lime and other additional substances and subsequently a contact salt is added such as chlorid of calcium, aluminium and magnesium salts. The mixture is then subjected to a heat varying from 650 to 1050 degrees centigrade without however causing melting. It is advantageous for the expedition of the reaction to carry out the latter in an atmosphere of steam and air.

The sewage-oven residues consist of approximately 53 per cent. $SiO_2$, 12 per cent. $Al_2O_3$, 11 per cent. $Fe_2O_3$, 15 per cent. CaO, 1.5 per cent. MgO, 2 per cent. sulfur and phosphorus and 5.5 per cent. alkali metal chlorids. If for example such a residue has added to it 1.39 times its weight of lime and a proportional amount of contact salt and if the whole is subjected to a heat of from 600 to 1050 degrees centigrade during a short time an excellent Portland cement can be obtained comprising about 65 per cent. CaO, 23 per cent. $SiO_2$, 5 per cent. $Al_2O_3$, 4.6 per cent. $Fe_2O_3$, which is a good average of the composition of Portland cement. The kind and quality of the additional substances are determined by the composition of the raw materials and the kind of the desired final product.

When the gases are to be removed from sludge the additional substances may be added before said removal takes place, whereby the removal of gases, which is carried out in a temperature of from 400 to 700 degrees centigrade, is united with the hereinbefore described process.

In strongly ferruginous residues the content of iron is diminished by suitable means preferably before the mixture is subjected to the chemical reaction in the furnace. The iron can be removed in any desired manner or its proportion is reduced by an increased addition of lime, clay, silica and so forth. The additional substances, calcium oxid, lime-stone, silicates, blast furnace slag or the like can be added to the raw material before the combustion takes place in the sewage-oven. By mixing residues poor in lime and rich in iron with blast furnace slag rich in lime and poor in iron great advantages may be obtained in such districts where suitable blast furnace slag is cheap. The addition of lime and consequently that of contact salts are hereby reduced so that the costs of production are minimized.

To disintegrate and also to comminute the residues discharged from the sewage combustion oven or from the sewage gas distillation apparatus said residues are exposed to a current of air, or of steam, or of a mixture of steam and air. This process is however not intended to form part of the present invention.

The contact salts may be either in liquid or in pulverized or in crystallized form and can be mixed with the residues either before or after their grinding.

Having now fully described my invention and the manner in which it is to be carried out, I declare, that what I claim, is:

Method for the production of cement, from a combustion residue of sewage containing about 53% silica, about 23% total of oxids of iron and aluminium, about 15% of calcium oxid, and about 5% of alkali metal chlorids, consisting in mixing such residue with at least substantially an equal amount of lime, and with calcium chlorid, heating the mixture to a temperature of 600° to 1050° centigrade for a sufficient time to form a Portland cement and treating the mixture with steam and air during said heating.

In testimony that I claim the foregoing as my invention I have signed my name in presence of two subscribing witnesses.

JULIUS ELSNER.

Witnesses:
 HENRY HASPER,
 WOLDEMAR HAUPT.